United States Patent
Hatano et al.

(10) Patent No.: US 10,343,356 B2
(45) Date of Patent: Jul. 9, 2019

(54) METHOD AND APPARATUS FOR REPAIRING HONEYCOMB CORE SANDWICH PANEL

(71) Applicant: MITSUBISHI AIRCRAFT CORPORATION, Aichi (JP)

(72) Inventors: Kohei Hatano, Tokyo (JP); Masayoshi Suhara, Tokyo (JP); Toshikazu Shigetomi, Tokyo (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 398 days.

(21) Appl. No.: 14/220,624

(22) Filed: Mar. 20, 2014

(65) Prior Publication Data
US 2014/0290831 A1    Oct. 2, 2014

(30) Foreign Application Priority Data
Mar. 28, 2013 (JP) .................................. 2013-69368

(51) Int. Cl.
*B29C 73/10* (2006.01)
*B29C 73/12* (2006.01)
*B29C 35/16* (2006.01)

(52) U.S. Cl.
CPC .............. *B29C 73/10* (2013.01); *B29C 73/12* (2013.01); *B29C 2035/1616* (2013.01); *B29C 2035/1658* (2013.01)

(58) Field of Classification Search
CPC ................................ B29C 73/10; B29C 73/12
USPC ........................................... 156/94, 499, 311
See application file for complete search history.

(56) References Cited

U.S. PATENT DOCUMENTS

| | | | | | |
|---|---|---|---|---|---|
| 4,560,428 | A | * | 12/1985 | Sherrick | B29C 35/0272 156/273.9 |
| 5,868,886 | A | * | 2/1999 | Alston et al. | 156/98 |
| 6,149,749 | A | * | 11/2000 | McBroom | B29C 73/02 156/87 |
| 6,596,373 | B1 | * | 7/2003 | Kishi | C08J 3/24 428/116 |

(Continued)

FOREIGN PATENT DOCUMENTS

JP    11-320724 A    11/1999

OTHER PUBLICATIONS

Choi et al., "Bondline strenght evaluation of cocure/precured honeycomb sandwich structures under aircraft hygro and repair environments", Dec. 8, 2009, ScienceDirect.*

*Primary Examiner* — Jeffry H Aftergut
*Assistant Examiner* — Jaeyun Lee
(74) *Attorney, Agent, or Firm* — Pearne & Gordon LLP

(57) ABSTRACT

To reduce a time required for repairing a honeycomb core sandwich panel. A repair method according to the present invention is a repair method, in which a repair patch 20 is disposed on a repair target portion that exists on the side of a repair surface 1A of a honeycomb core sandwich panel 1, the honeycomb core sandwich panel 1 being formed by sandwiching a honeycomb structured core 10 with a plurality of cells between skins 11 and 12, the method including: a heating step of heating the repair patch 20; and a cooling step of cooling the honeycomb core sandwich panel 1 from the side of a second surface 1B opposing the repair surface 1A of the honeycomb core sandwich panel 1.

15 Claims, 5 Drawing Sheets

(56) References Cited

U.S. PATENT DOCUMENTS

2006/0156927 A1\* 7/2006 Udagawa ........... B01D 46/0001
                                                  96/417
2007/0113953 A1\* 5/2007 Haywood ....................... 156/94
2008/0110575 A1\* 5/2008 Graham ........................ 156/538
2009/0184200 A1\* 7/2009 Lin ........................... B64C 1/26
                                                  244/1 N \* cited by examiner

METHOD AND APPARATUS FOR REPAIRING HONEYCOMB CORE SANDWICH PANEL

BACKGROUND OF THE INVENTION

Field of the Invention

The present invention relates to a method for repairing a honeycomb core sandwich panel which is formed by sandwiching a honeycomb structured core between skins, and an apparatus for repairing the same.

Description of the Related Art

When an outer panel (skin) forming an outer surface of a fuselage or a wing of an aircraft is damaged by a lightning strike or a flying object such as hail, the outer panel needs to be repaired. To repair the outer panel, a composite material made of FRP (fiber reinforced plastics) or the like is used.

The composite material is fabricated by a method (wet lay-up) of impregnating fiber sheets with liquid thermosetting resin, laminating the fiber sheets, and curing the resin by heating, or a method of laminating semi-cured intermediate materials (prepregs), and curing the prepregs by heating. There is also a method of using a repair patch (a pre-cured patch) that is preliminarily thermally cured as the composite material, and bonding the repair patch to the outer panel by using a thermosetting adhesive.

The aircraft outer panel is formed by a lightweight and highly-rigid honeycomb core sandwich panel as well as metal and a composite material.

The honeycomb core sandwich panel is a panel having a structure in which a honeycomb structured core with a plurality of cells having a hexagonal cross section is held between skins.

In Japanese Patent Laid-Open No. 11-320724, a honeycomb core is fabricated by using gappy FRP obtained by impregnating with resin a fiber base material where a gap is formed between woven fibers. Since partition walls between cells of the core have breathability, gas produced in thermal-curing of an adhesive for bonding skins to the honeycomb core can be released outside (degased).

When the honeycomb core sandwich panel is repaired, it is necessary to cure the thermosetting resin contained in the composite material by heating the composite material by a heating device.

To reliably cure the thermosetting resin at the time of heating, the panel is maintained at a high temperature for a predetermined time. Moisture accumulated in the cells or on the partition walls of the core of the panel thereby becomes water vapor to generate a high pressure within the cells. The panel may be destroyed by the water vapor pressure.

When the core in which the partition walls between the cells have breathability as in Japanese Patent Laid-Open No. 11-320724 is employed, the water vapor pressure can be reduced to some extent. However, the panel cannot be reliably prevented from being destroyed. Moreover, it is difficult to fabricate the core as described above, and such the core results in a high cost.

Therefore, to reliably prevent the panel from being destroyed at the time of repair, a drying step of sufficiently drying the core to eliminate water is performed before heating. It thus takes a very long time to repair the panel.

An object of the present invention is to reduce a time required for repairing the honeycomb core sandwich panel.

SUMMARY OF THE INVENTION

A repair method according to the present invention is a repair method, in which a repair material is disposed on a repair target portion that exists on a first surface side of a honeycomb core sandwich panel, the honeycomb core sandwich panel being formed by sandwiching a honeycomb structured core with a plurality of cells between skins, the method including: a heating step of heating the repair material that is disposed on the repair target portion; and a cooling step of cooling the honeycomb core sandwich panel from a second surface side of the honeycomb core sandwich panel.

In the heating step, the repair material may be heated and cured (thermal curing step).

Here, the repair material includes various forms. For example, the repair material corresponds to a pre-cured patch that is preliminarily cured, and a thermosetting adhesive that bonds the pre-cured patch to the periphery of the repair target portion.

As another form, the repair material corresponds to a prepreg. When the prepreg is bonded to the periphery of the repair target portion, the repair material corresponds to the prepreg and a thermosetting adhesive.

As yet another form, the repair material corresponds to liquid thermosetting resin and fiber in the case of performing wet lay-up.

In the present invention, when the repair material is heated so as to cure the thermosetting repair material, heat is also transferred to the panel via the repair material. Thus, the temperature of the panel is increased. Meanwhile, the panel is cooled from the second surface side. The heat transferred to the panel from the first surface side is thereby partly canceled by cooling from the second surface side.

Therefore, even when a region around the repair target portion of the panel has a high temperature, the temperature of an inner portion of the core (within the cells and partition walls) is not increased to a high temperature. At this point, the temperature inside the core is maintained within a temperature range in which at least boiling of water can be avoided since the heat is transferred by air convection within the cells. Thus, an increase in internal pressure of the cells due to evaporation of moisture accumulated within the core can be suppressed. As a result, the panel can be prevented from being destroyed since the skin is not separated from the core due to the increase in internal pressure of the cells.

Therefore, a step of drying the core of the panel in advance so as to prevent the destruction due to a water vapor pressure can be omitted. A time required for repairing the honeycomb core sandwich panel can be considerably reduced.

In the repair method according to the present invention, in the thermal curing step, a temperature of the repair material may be controlled to be maintained at a target constant temperature not falling below a temperature required for curing the repair material based on a detected temperature of the repair material.

By maintaining the temperature of the repair material at the target constant temperature, the repair material can be reliably cured. It is also possible to avoid an excessive increase in the temperature inside the core to promote evaporation of moisture within the core. The skin made of a composite material or resin can be also prevented from being altered by excess heat.

In the repair method according to the present invention, in the cooling step, a temperature of the second surface side of the honeycomb core sandwich panel may be controlled to be maintained at less than 100° C. based on a detected temperature of the second surface side.

Accordingly, boiling of moisture existing within the core can be prevented. The destruction of the panel due to the water vapor pressure can be thereby avoided.

Here, the temperature of the second surface side of the panel is preferably controlled to be maintained at, for example, 70° C. or less so as to suppress the increase in internal pressure of the cells due to the evaporation of moisture.

As another aspect, the present invention provides a repair method, in which a repair material is disposed on a repair target portion that exists on a first surface side of a honeycomb core sandwich panel, the honeycomb core sandwich panel being formed by sandwiching a honeycomb structured core with a plurality of cells between skins, the method including: a step of heating and melting the repair material, and thereafter solidifying the repair material; and a cooling step of cooling the honeycomb core sandwich panel from a second surface side of the honeycomb core sandwich panel.

Also, in the present invention, while the temperature of the panel is increased by heating the repair material located on the first surface side of the panel, the panel is cooled from the second surface side. Thus, an increase in internal pressure of the cells due to evaporation of moisture accumulated within the core can be suppressed. As a result, the panel can be prevented from being destroyed due to the increase in internal pressure of the cells.

The present invention may be applied to a repair apparatus.

A repair apparatus according to the present invention is a repair apparatus for repairing a repair target portion that exists on a first surface side of a honeycomb core sandwich panel formed by sandwiching a honeycomb structured core with a plurality of cells between skins, the apparatus including: a heating device that heats a repair material that is disposed on the repair target portion; and a cooling device that cools the honeycomb core sandwich panel from a second surface side of the honeycomb core sandwich panel.

In accordance with the present invention, the time required for repairing the honeycomb core sandwich panel can be reduced.

DETAILED DESCRIPTION OF THE PREFERRED EMBODIMENTS

In the following, embodiments according to the present invention are described in detail by reference to the accompanying drawings.

First Embodiment

The configuration of a honeycomb core sandwich panel obtained by repair is described first, and a method for repairing the honeycomb core sandwich panel is subsequently described.

Figure 1:
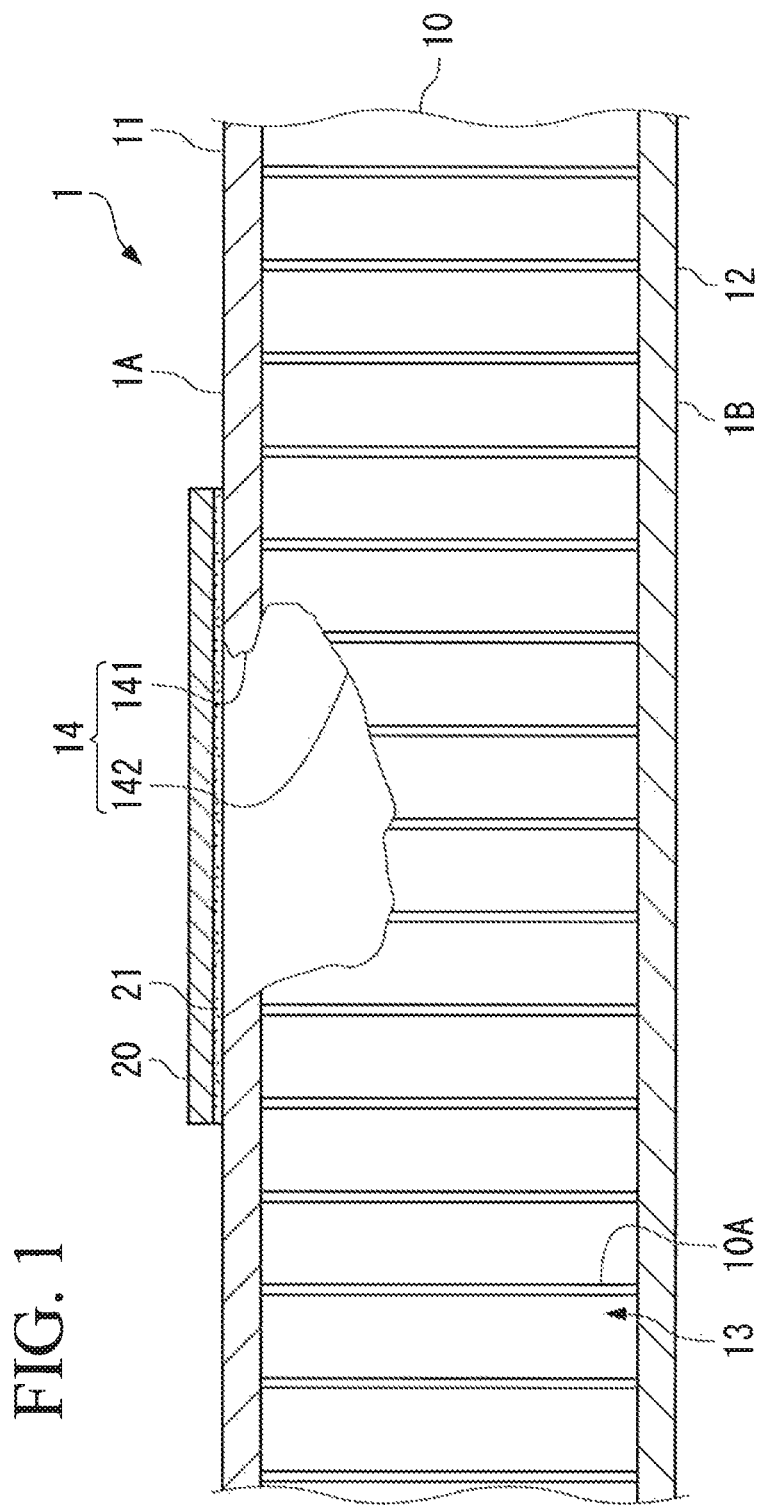
FIG. 1 is a sectional view schematically illustrating a honeycomb core sandwich panel according to a first embodiment.

A honeycomb core sandwich panel 1 shown in FIG. 1 is used for an outer panel that constitutes an outer surface of a wing or a fuselage of an aircraft.

The honeycomb core sandwich panel 1 (also referred to as panel 1 below) has a structure in which a honeycomb structured core (a core material) 10 is held between two skins 11 and 12. The panel 1 may also include a layer other than the core 10 and the skins 11 and 12.

The core 10 includes partition walls 10A that partition the core 10 into a plurality of cells 13 having a hexagonal cross section. The core 10 is made of a composite material, metal, or resin.

The skins 11 and 12 are also made of a composite material, metal, or resin, and bonded to end surfaces of the core 10. Openings surrounded by the partition walls 10A are closed by the skins 11 and 12 to seal the cells 13.

Since each of the cells 13 has an airspace therein, the core 10 includes air. Moisture is included in the air. Moisture is also retained on the partition walls 10A. Dew condensation of water may occur on the surfaces of the partition walls 10A. Therefore, moisture is accumulated within the core 10.

The panel 1 may be damaged upon receiving an impact by a lightning strike, hail or the like. In this case, a repair target portion 14 that requires repair is formed in the panel 1.

The repair target portion 14 is formed when a flying object such as hail passes through the skin 11, and enters into the core 10. The repair target portion 14 includes a skin damage hole 141 that penetrates the skin 11 in a plate thickness direction, and a core damage recess 142 that communicates with the skin damage hole 141.

The periphery of the skin damage hole 141 in the skin 11 preferably has a flat and smooth surface through sanding and cleaning so as to improve adhesiveness with a repair patch 20.

When the repair target portion 14 is formed, rainwater or cleaning water enters into the core 10 through the repair target portion 14. More moisture is thereby accumulated within the core 10.

The repair target portion 14 is covered with the plate-like repair patch 20 that is made of a composite material. The rear surface of the repair patch 20 is bonded to the skin 11 around the repair target portion 14.

In the present embodiment, the skin damage hole 141 is closed by the repair patch 20 without filling the core damage recess 142. However, the core damage recess 142 may be also filled with a repair member.

The repair patch 20 is fabricated by laminating sheets of carbon fiber, impregnating the laminate with thermosetting resin such as epoxy resin and polyimide resin, and curing the thermosetting resin by heating. The repair patch 20 is a pre-cured patch that is preliminarily cured before repair.

Glass fiber may be also used for the repair patch 20 instead of the carbon fiber. Any type of fiber may be used. The repair patch 20 may be also fabricated from metal.

A conductive lightning-protection material formed in a sheet-like shape may be also laminated on the repair patch 20.

An adhesive layer 21 made of thermosetting resin is interposed between the repair patch 20 and the skin 11. The adhesive layer 21 constitutes a repair material together with the repair patch 20.

The repair patch 20 and the skin 11 are bonded together with the adhesive layer 21, and thereby integrated together.

Figure 2:
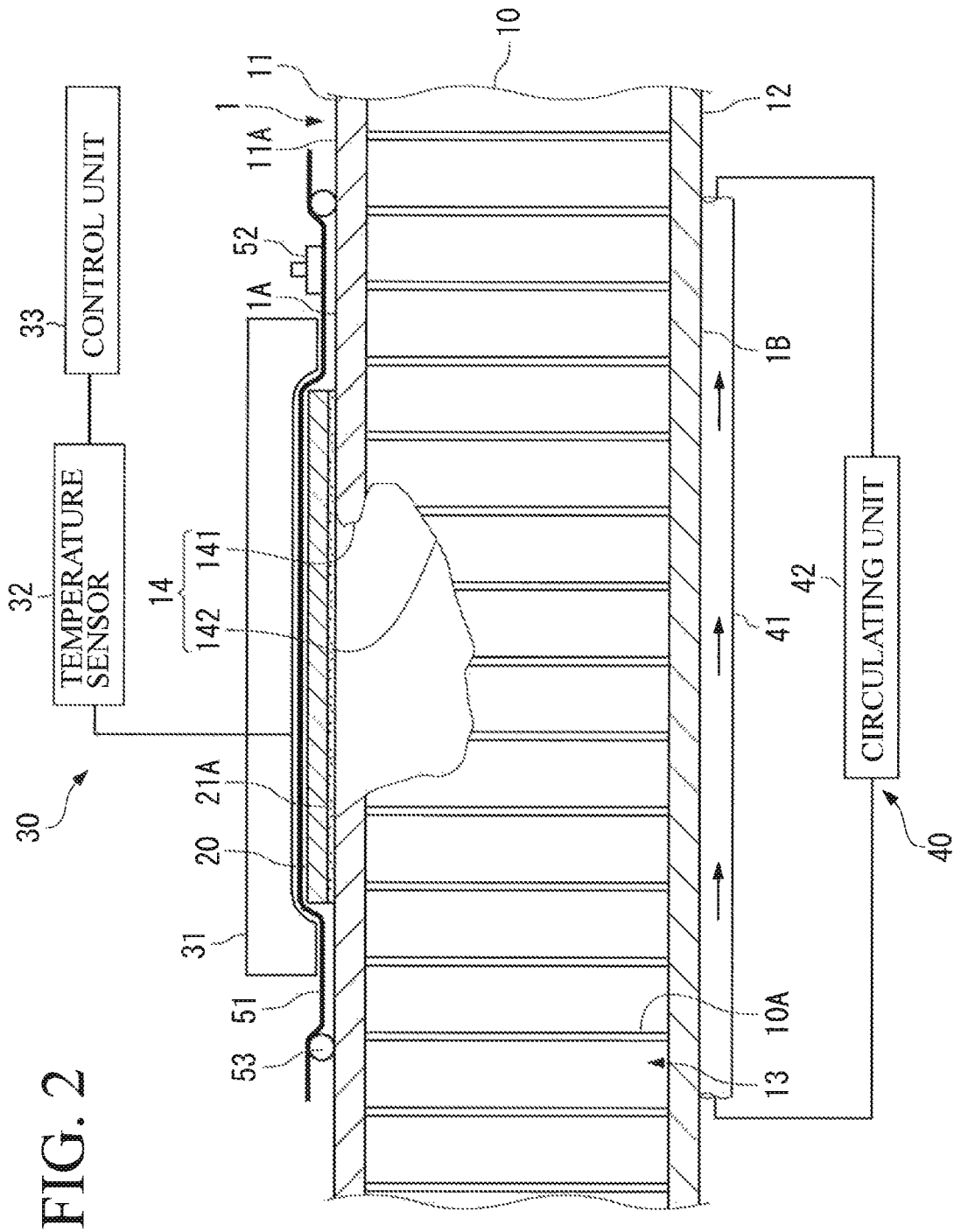
FIG. 2 is a view illustrating a thermal curing step in a procedure for repairing the honeycomb core sandwich panel.

The adhesive layer 21 is cured by heating the repair patch 20 by a heating device 30 shown in FIG. 2.

The heating device 30 includes a substantially plate-like rubber heater mat 31 that incorporates a heater, a temperature sensor 32, and a control unit 33.

The heater mat 31 is arranged on the side of a repair surface 1A (the surface of the skin 11) of the panel 1 to which the repair patch 20 is bonded. A heat gun that emits hot air, or an oven capable of accommodating the panel 1 may be also used instead of the heater mat 31.

The temperature sensor 32 detects the temperature of the repair patch 20.

The control unit 33 adjusts the output of the heater mat 31 based on the temperature detected by the temperature sensor 32.

In the present embodiment, the panel 1 is cooled by a cooling device 40 from a side opposite to the repair surface 1A where the repair patch 20 is heated by the heating device 30.

The cooling device 40 includes a hose 41 that is mounted on a second surface 1B (the surface of the skin 12) of the panel 1 opposing the repair surface 1A, and a circulating unit 42 that circulates water in the hose 41.

The hose 41 is made of rubber and has elasticity. Thus, even when the second surface 1B has a curved surface, the hose 41 can be fixed to the second surface 1B in a press and close contact state. The hose 41 is arranged in a meandering shape, or in a spiral shape over a predetermined range on the second surface 1B including a region where the repair patch 20 is projected onto the second surface 1B. Accordingly, heat is evenly transferred from the water flowing through the hose 41 to the second surface 1B, and the panel 1 is effectively cooled by heat exchange between the water in the hose 41 and the panel 1.

The circulating unit 42 includes a pipe that is connected to the hose 41, and a pump that pumps water flowing through the pipe. Even when the water in the hose 41 is heated by absorbing heat from the panel 1, the heat is diffused while flowing through the pipe of the circulating unit 42. A temperature rise of the water in the hose 41 can be thereby suppressed.

The cooling temperature of the second surface 1B can be controlled by providing a control unit that controls the water temperature or the flow velocity of the circulating water, if necessary.

In the present embodiment, the repair target portion 14 formed in the honeycomb core sandwich panel 1 is repaired by using the heating device 30 and the cooling device 40 described above.

In the following, the method for repairing the honeycomb core sandwich panel 1 is described.

First, the repair patch 20 and a thermosetting adhesive 21A which is formed in a film-like shape are arranged on the repair surface 1A of the panel 1 to cover the repair target portion 14.

The adhesive 21A may be formed in a shape similar to that of the repair patch 20 as shown in the drawing, or in an annular shape along the periphery of the repair target portion 14.

Subsequently, the repair patch 20 and its surrounding region are covered with a heat-resistant bag film 51. A gap between the bag film 51 and the repair surface 1A is sealed by a sealant tape 53 that is provided in an annular shape around the repair target portion 14. Vacuum drawing is then performed through a valve 52 provided in the bag film 51.

The repair patch 20 is pressed against the repair surface 1A due to a difference between a pressure inside the bag film 51 decompressed by the vacuum drawing and an external atmospheric pressure. The repair patch 20 can be thereby uniformly brought into close contact with the repair surface 1A via the adhesive 21A. It is preferable to continuously perform the vacuum drawing when heating is subsequently performed by the heater mat 31.

Subsequently, the heater mat 31 is placed on the repair patch 20 from above the bag film 51, and the hose 41 is mounted on the side of the second surface 1B of the panel 1.

The adhesive 21A is cured by supplying electricity to the heater mat 31, and heating the repair patch 20 by heat emitted from the heater mat 31. The panel 1 is also cooled by circulating water in the hose 41. That is, a cooling step is performed at the same time as a thermal curing step using the heating device 30.

At this point, the heating device 30 heats the repair patch 20 at a heating temperature and for a heating time enough to reliably cure the adhesive 21A. It is necessary to heat the repair patch 20 at a temperature equal to or more than the temperature enough to reliably cure the adhesive 21A, and at which the composite material used for the skin 11 is not altered, and evaporation of the moisture accumulated within the core 10 is not promoted.

Therefore, the control unit 33 performs feedback control to adjust the output of the heater mat 31 such that the temperature of the repair patch 20 is maintained at a target constant temperature (e.g., 120° C.) that does not fall below a temperature required for curing the adhesive, but does not largely exceeds the temperature based on the temperature detected by the temperature sensor 32.

The heat emitted from the heater mat 31 is also transferred to the panel 1 via the repair patch 20 and the adhesive 21A, so that the temperature of the panel 1 is increased. Meanwhile, the panel 1 is cooled by the heat exchange with the water in the hose 41. The heat transferred to the panel 1 from the heater mat 31 is thereby partly absorbed by the water in the hose 41, and canceled.

Therefore, even when the repair surface 1A side of the panel 1 has a high temperature, the temperature of the second surface 1B side of the panel 1 is not increased to a high temperature. At this point, the temperatures of the insides of the cells 13 and the partition walls 10A of the core 10 are between the temperatures of the repair surface 1A side and the second surface 1B side since the heat is transferred by air convection within the cells 13, and maintained within a temperature range in which at least boiling of water can be avoided. Thus, an increase in internal pressure of the cells 13 due to evaporation of the water accumulated within the core 10 is suppressed.

Therefore, the panel 1 can be prevented from being destroyed since the skins 11 and 12 are not separated from the core 10 due to the increase in internal pressure of the cells 13.

When the heating using the heating device 30 is performed for a predetermined time, the repair patch 20 is reliably bonded to the panel 1.

Finish processing of the repair patch 20 and the surrounding region is performed, if necessary. The repair of the panel 1 is thereby completed.

In the repair method in the present embodiment, when the repair patch 20 is heated by the heating device 30 to cure the adhesive 21A, the panel 1 is cooled by the cooling device 40 from the side of the second surface 1B opposite to the repair surface 1A. The panel 1 can be thereby prevented from being destroyed. It is thus not necessary to perform a step of drying the core 10 in advance so as to prevent the destruction due to a water vapor pressure. It takes a very long time to sufficiently dry the core 10 in which moisture is retained in the air within the plurality of cells 13 and on the partition walls 10A. In accordance with the repair method in the present embodiment, since the drying step is omitted, a time required for repairing the panel 1 can be considerably reduced.

In the above embodiment, the output of the heater mat 31 is variable, and the control unit 33 performs control to maintain the temperature of the repair patch 20 at a predetermined temperature based on the detected temperature from the temperature sensor 32.

Instead of controlling the heating temperature by the heating device 30 as described above, the cooling temperature may be also controlled by the cooling device 40.

Figure 3:
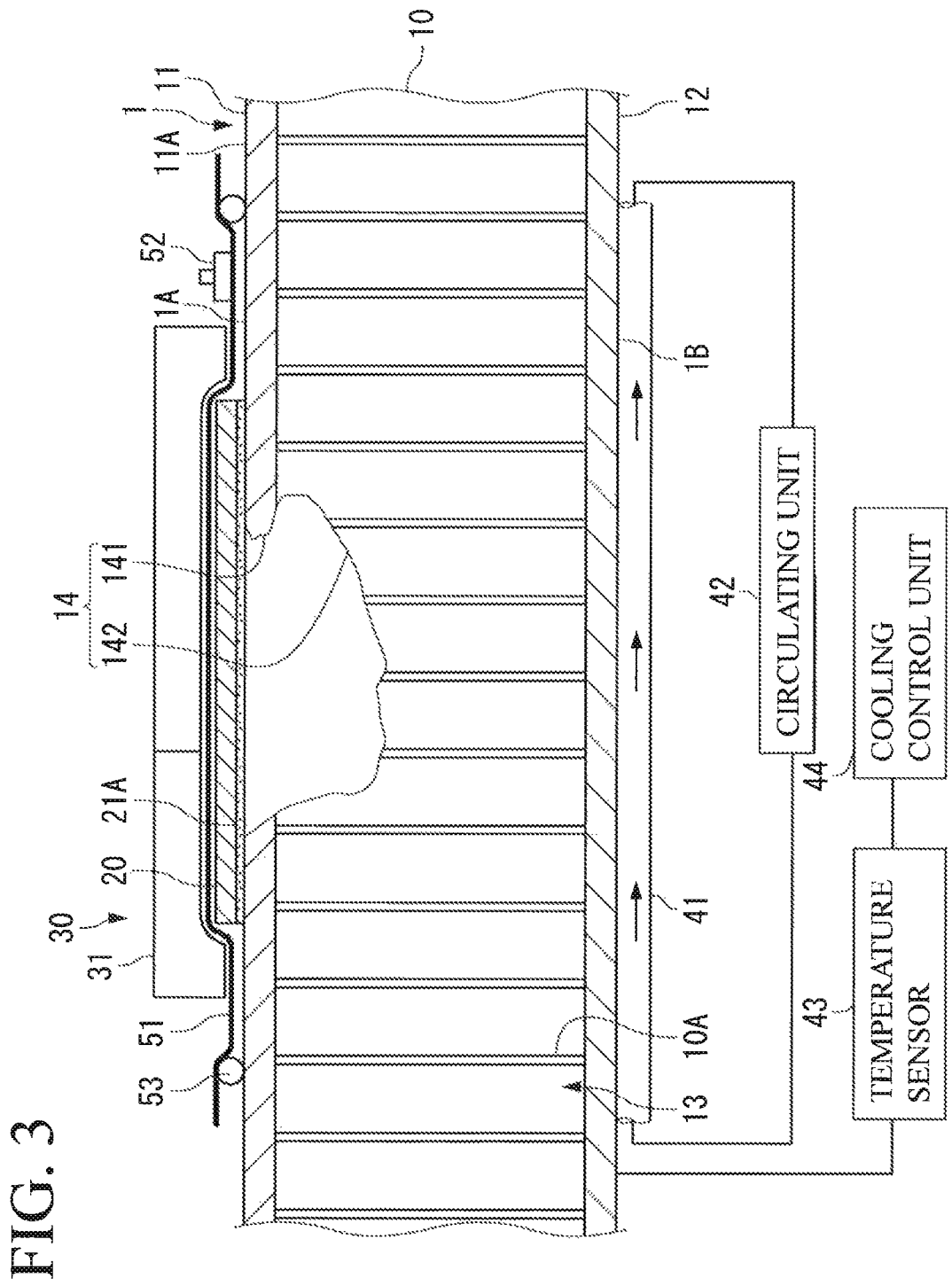
FIG. 3 is a view illustrating a modification of the first embodiment.

To control the cooling temperature, a temperature sensor 43 that detects the temperature of the second surface 1B of the panel 1, and a cooling control unit 44 that controls the water temperature or the flow velocity of the circulating water so as to maintain the temperature of the second surface 1B at a predetermined temperature or less based on the temperature detected by the temperature sensor 43 are provided in the cooling device 40 as shown in FIG. 3.

After the heater mat 31 is set to a constant output so as to heat the repair patch 20 to the temperature enough to reliably cure the adhesive 21A, the cooling control unit 44 is operated so as to maintain the second surface 1B at a predetermined temperature or less.

Instead of detecting the temperature of the second surface 1B, the water temperature in the hose 41 may be detected, and the cooling control unit 44 may be operated so as to maintain the water temperature in the hose 41 at a predetermined temperature or less. The second surface 1B can be also maintained at a predetermined temperature or less in this manner.

Here, the temperature of the second surface 1B only needs to be maintained at a temperature less than 100° C. so as to avoid boiling of the water within the core 10. The temperature is preferably set to, for example, 70° C. or less so as to suppress the increase in internal pressure of the cells 13 due to the moisture evaporation.

Both the heating temperature and the cooling temperature may be controlled. To this end, the temperature sensor 32 and the control unit 33 may be provided in the heating device 30, and the temperature sensor 43 and the cooling control unit 44 may be provided in the cooling device 40.

Thermoplastic resin such as nylon, polyethylene, polystyrene, and polyvinyl chloride may be also used for the repair material disposed on the repair target portion 14.

For example, when a prepreg obtained by semi-curing fiber impregnated with thermoplastic resin is used as the repair material, a step of heating and melting the repair material located on the side of the repair surface 1A of the panel 1, and thereafter solidifying the repair material, and a cooling step of cooling the panel 1 from the side of the second surface 1B of the panel 1 are performed. In this case, the same effects as those of the case in which the thermosetting resin is used can be obtained.

Second Embodiment

Figure 4:
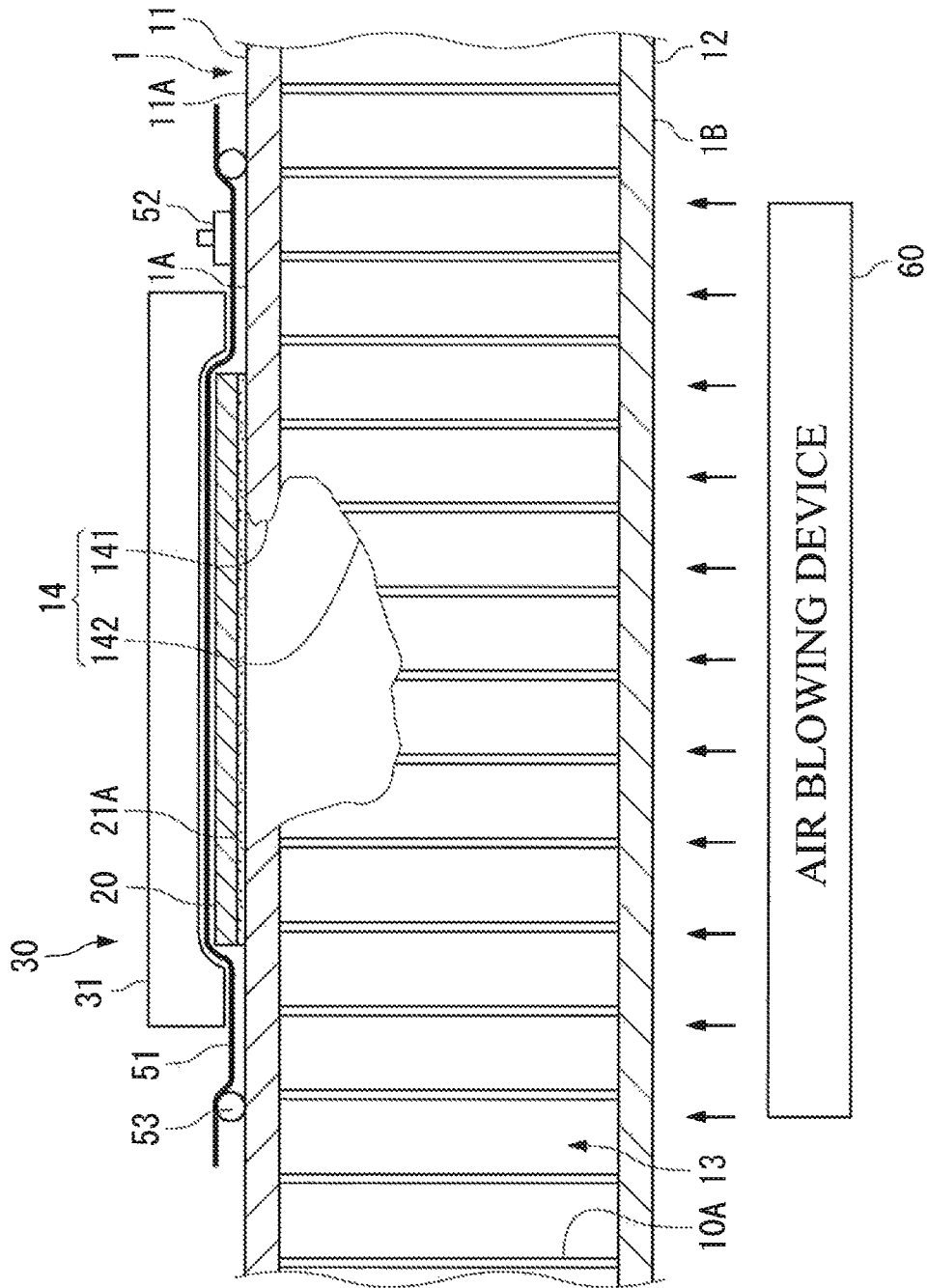
FIG. 4 is a view illustrating a thermal curing step in a repair procedure in a second embodiment.

Next, a second embodiment of the present invention is described by reference to FIG. 4.

Differences from the first embodiment are mainly described in the second and subsequent embodiments. The same components as those of the first embodiment are assigned the same reference numerals.

In a repair method according to the second embodiment, an air blowing device 60 is used as the cooling device for cooling the panel 1.

The air blowing device 60 is mounted so as to oppose the second surface 1B of the panel 1. When the air blowing device 60 is operated, external air is blown toward the second surface 1B by an incorporated fan. The air blowing device 60 is mounted so as to blow external air to a predetermined range on the second surface 1B including a region where the repair patch 20 is projected onto the second surface 1B. The second surface 1B is cooled by the external air blown by the air blowing device 60.

In the present embodiment, the repair target portion 14 formed in the panel 1 is repaired by using the heating device 30 and the air blowing device 60.

In the present embodiment, after the adhesive 21A and the repair patch 20 are arranged on the repair surface 1A of the panel 1 to cover the repair target portion 14, the bag film 51 is overlaid on the repair patch 20, and vacuum drawing is performed in a similar manner to the first embodiment.

Subsequently, the heater mat 31 is placed on the repair patch 20, and the adhesive 21A is cured by heating the repair patch 20 by the heating device 30 in a similar manner to the first embodiment. The panel 1 is also cooled by the air blowing device 60 on the side of the second surface 1B.

The heat transferred to the panel 1 from the heater mat 31 is thereby partly absorbed by the external air blown toward the second surface 1B, and canceled.

As a result, the panel 1 can be prevented from being destroyed since a temperature rise within the core 10 is suppressed, and the increase in internal pressure of the cells 13 due to the moisture evaporation within the core 10 is thereby suppressed.

In accordance with the present embodiment, since the step of drying the core 10 is not required, a time required for repairing the honeycomb core sandwich panel 1 can be considerably reduced in a similar manner to the first embodiment.

By using the air blowing device 60 so as to cool the panel 1, the panel 1 can be sufficiently cooled by spreading the external air to every corner even when the second surface 1B has a complicated shape.

In the present embodiment, the temperature of the second surface 1B can be also controlled in a similar manner to the cooling temperature control described above.

The temperature sensor 43 that detects the temperature of the second surface 1B, and the cooling control unit 44 that controls the air volume or the wind speed of the fan of the air blowing device 60 based on the detected temperature may be provided in the air blowing device 60.

A water feeding device provided with a nozzle for ejecting water toward the second surface 1B may be also used instead of the air blowing device 60.

Third Embodiment

Figure 5:
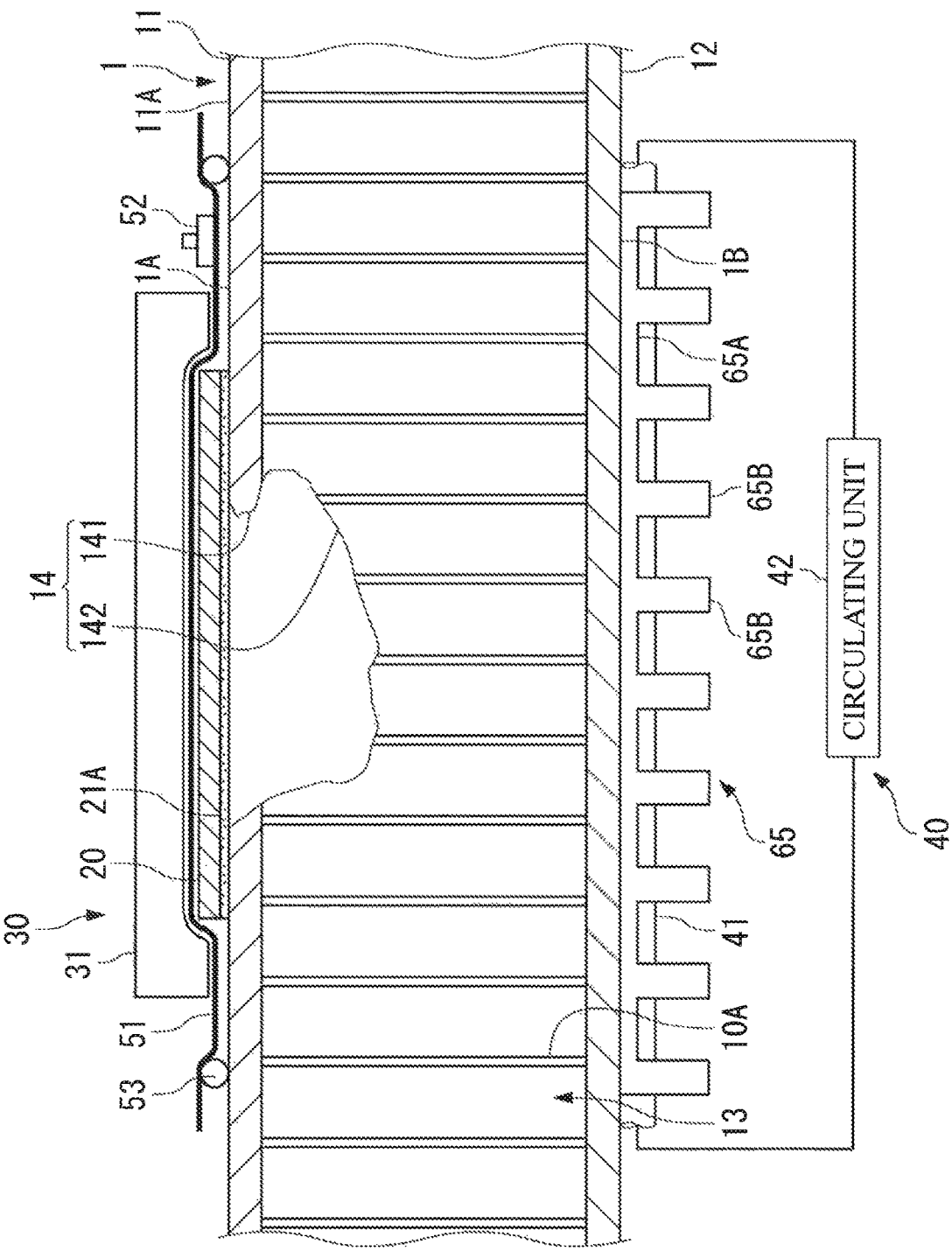
FIG. 5 is a view illustrating a thermal curing step in a repair procedure in a third embodiment.

Next, a third embodiment of the present invention is described by reference to FIG. 5.

In a repair method according to the third embodiment, the cooling of the panel 1 is assisted by a heat dissipation jig.

In the present embodiment, the heating device 30 is mounted on the side of the repair surface 1A of the panel 1, and the cooling device 40 is mounted on the side of the second surface 1B in a similar manner to the first embodiment. A heat dissipation jig 65 is also mounted on the second surface 1B.

The heat dissipation jig 65 includes a plate-like base 65A that is fixed in a state in close contact with the second surface 1B, and a plurality of fins 65B that rise from the surface of the base 65A with an interval therebetween.

The base 65A is arranged between opposing portions of the meandering hose 41.

The fins 65B are preferably made of metal with high heat conductivity (e.g., copper), or metal with favorable heat conductivity (e.g., aluminum) so as to be thick.

In the present embodiment, after the adhesive 21A and the repair patch 20 are arranged on the repair surface 1A to cover the repair target portion 14, vacuum drawing is performed. While the adhesive 21A is cured by heating the repair patch 20 by the heating device 30 in a similar manner to the above embodiments, the panel 1 is cooled on the side of the second surface 1B by the cooling device 40.

At this point, the heat of the panel 1 is absorbed by the fins 65B via the base 65A mounted on the second surface 1B, and released to external air from the fins 65B. Since the cooling of the panel 1 is promoted by dissipating the heat by using the fins 65B, the increase in internal pressure of the cells 13 due to the moisture evaporation within the core 10 can be more sufficiently suppressed. Accordingly, the panel 1 can be more reliably prevented from being destroyed.

The hose 41 may be also fixed in a state in close contact with the surfaces of the fins 65B. The fins 65B are thereby cooled by the water flowing through the hose 41. Therefore, the heat absorbing and dissipating effects of the fins 65B can be improved.

The air blowing device 60 in the second embodiment may be also employed instead of the cooling device 40, and both the air blowing device 60 and the heat dissipation jig 65 may be used in combination.

In the respective embodiments described above, the repair patch 20 is heated by the heating device while the panel 1 is cooled by the cooling device. When the panel 1 has large heat capacity, the panel 1 may be cooled in advance before heating the repair patch 20. That is, the thermal curing step may be also performed after completion of the cooling step in the present invention.

The cooling device used in the cooling step is not limited to the cooling device 40 and the air blowing device 60 described above, and may employ any configuration.

In the aforementioned respective embodiments, the repair method for bonding the pre-cured repair patch 20 around the repair target portion 14 is employed. The present invention may be also applied to a method of laminating a prepreg on the repair target portion 14 and curing thermosetting resin contained in the prepreg by heating, or wet lay-up in which fiber sheets impregnated with liquid thermosetting resin are laminated on the repair target portion 14, and the resin is cured by heating.

In the method using the prepreg, the thermal curing step is performed in a similar manner to the aforementioned embodiments so as to cure the thermosetting resin contained in the prepreg. The repair material in the present invention is obtained by curing the prepreg.

In the wet lay-up, the thermal curing step is performed in a similar manner to the aforementioned embodiments so as to cure the liquid thermosetting resin. The repair material in the present invention is obtained by curing the liquid thermosetting resin.

In accordance with the present invention, regardless of the form of the repair material, the same actions and effects as those described above can be obtained by cooling the panel 1 from the second surface side opposing the repair surface on which the repair material to be heated is provided.

The present invention may be also applied to a honeycomb core sandwich panel including a plurality of cores. For example, a honeycomb core sandwich panel in which a skin, a core, a skin, a core, and a skin are laminated in this order can be also repaired in the above procedure.

In accordance with the repair method according to the present invention, not only the outer panel of the aircraft, but a wall material, a floor material, a ceiling material, a door or the like provided in the aircraft may be also repaired in a similar manner to the aforementioned respective embodiments.

The present invention may be also applied to repair a structural object or accessories of the aircraft.

Furthermore, the present invention may be applied to repair any object of repair, e.g., a wind turbine blade in addition to the members of the aircraft. The present invention may be applied to repair various objects damaged by impact, high temperature, abrasion, erosion or the like.

The constitutions described in the aforementioned embodiments may be also freely selected or changed into other constitutions without departing from the gist of the present invention.

What is claimed is:

1. A method for repairing a honeycomb core sandwich panel, in which a repair material is disposed on a repair target portion that exists on a first surface side of the honeycomb core sandwich panel, the repair material not being disposed on a second surface side of the honeycomb core sandwich panel, the honeycomb core sandwich panel being formed by sandwiching a honeycomb structured core with a plurality of cells between skins, the method comprising:
   a heating step of heating, with a heating device comprising a heater placed over the repair material, the repair material that is disposed on the repair target portion without previously drying the honeycomb structured core as part of said repairing the honeycomb core sandwich panel; and
   a cooling step of cooling the honeycomb core sandwich panel from the second surface side of the honeycomb core sandwich panel, the cooling step being performed at the same time as the heating step, the cooling step comprising directly cooling the second surface side of the honeycomb core sandwich panel,
   wherein in the cooling step, a temperature of the second surface side of the honeycomb core sandwich panel is controlled to be maintained at less than a predetermined temperature based on a detected temperature of the second surface side.

2. The method according to claim 1, wherein in the heating step, the repair material is heated and cured.

3. The method according to claim 2, wherein in the heating step, a temperature of the repair material is controlled to be maintained at a target constant temperature not falling below a temperature required for curing the repair material based on a detected temperature of the repair material.

4. The method according to claim 1, wherein the predetermined temperature is less than 100° C.

5. The method according to claim 2, wherein the repair material comprises thermosetting adhesive.

6. The method according to claim 1, wherein in the heating step, the repair material is heated and melted, and thereafter solidified.

7. The method according to claim 6, wherein the repair material is a prepreg obtained by semi-curing fiber impregnated with thermoplastic resin.

8. An apparatus for repairing a honeycomb core sandwich panel, which repairs a repair target portion that exists on a first surface side of a honeycomb core sandwich panel, the honeycomb core sandwich panel being formed by sandwiching a honeycomb structured core with a plurality of cells between skins, the apparatus comprising:

a heater configured to be placed over, and heat a repair material that is disposed on the repair target portion;

a cooling device that cools the honeycomb core sandwich panel only from a second surface side of the honeycomb core sandwich panel;

a temperature sensor that detects a temperature of the second surface side; and a control unit that maintains the temperature of the second surface side at a predetermined temperature or less based on the temperature detected by the temperature sensor.

9. The method according to claim 1, wherein said heating step comprises heating the repair material on the repair target portion forming a region of an outer panel of an aircraft.

10. The method according to claim 1, wherein said honeycomb structured core is made of a composite material or a resin.

11. The apparatus according to claim 8, wherein said heater is configured to heat the repair material on the repair target portion forming a region of an outer panel of an aircraft.

12. The apparatus according to claim 8, wherein said honeycomb structured core is made of a composite material or a resin.

13. The apparatus according to claim 8, wherein the predetermined temperature is less than 100° C.

14. The apparatus according to claim 8, wherein the cooling device includes a hose configured to be mounted on the second surface side of the honeycomb core sandwich panel, and a circulating unit configured to circulate a cooling fluid in the hose.

15. The method according to claim 1, wherein the cooling step is performed with a cooling device, the cooling device comprising a hose mounted on the second surface side of the honeycomb core sandwich panel, and a circulating unit that circulates a cooling fluid in the hose.

* * * * *